United States Patent
Wisler et al.

(10) Patent No.: US 9,841,528 B2
(45) Date of Patent: *Dec. 12, 2017

(54) STEERABLE MAGNETIC DIPOLE ANTENNA FOR MEASUREMENT WHILE DRILLING APPLICATIONS

(71) Applicant: Precision Energy Services, Inc., Fort Worth, TX (US)

(72) Inventors: Macmillan M. Wisler, Kingwood, TX (US); Larry W. Thompson, Willis, TX (US); Jian-Qun Wu, Kingwood, TX (US); Lance Pate, Spring, TX (US)

(73) Assignee: Precision Energy Services, Inc., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/151,705

(22) Filed: May 11, 2016

(65) Prior Publication Data
US 2016/0252645 A1   Sep. 1, 2016

Related U.S. Application Data

(62) Division of application No. 12/575,566, filed on Oct. 8, 2009, now Pat. No. 9,366,780.

(51) Int. Cl.
*G01V 3/10* (2006.01)
*G01V 3/28* (2006.01)

(52) U.S. Cl.
CPC ..................................... *G01V 3/28* (2013.01)

(58) Field of Classification Search
CPC ........................................................ G01V 3/28
USPC ................................................ 324/333, 338
See application file for complete search history.

(56) References Cited

U.S. PATENT DOCUMENTS

| 5,530,358 | A  | * | 6/1996 | Wisler ...... | G01V 3/30 |
| | | | | | 324/338 |
| 8,120,361 | B2 | * | 2/2012 | Sinclair ..... | G01V 3/28 |
| | | | | | 324/338 |
| 8,264,228 | B2 | * | 9/2012 | Bittar ...... | G01V 3/28 |
| | | | | | 324/338 |
| 8,471,563 | B2 | * | 6/2013 | Wisler ...... | G01V 3/30 |
| | | | | | 324/346 |
| 9,140,817 | B2 | * | 9/2015 | Wisler ...... | G01V 3/30 |
| 9,329,298 | B2 | * | 5/2016 | Bittar ...... | G01V 3/28 |

* cited by examiner

*Primary Examiner* — Reena Aurora
(74) *Attorney, Agent, or Firm* — Blank Rome, LLP (57) ABSTRACT

A steerable, magnetic dipole antenna for Measurement-While-Drilling (MWD) or Logging-While-Drilling (LWD) applications. The antenna elements use a hole arrangement in addition to grooves in a steel tool body, which is typically a drill collar. This antenna embodiment is extremely robust, meaning that does not significantly reduce the structural integrity of the tool body in which it is disposed. The antenna embodiment is also relatively wear resistant. The resultant magnetic dipole generated by this antenna is also electrically steerable in inclination angle from a common origin. A variable dipole moment inclination angle combined with independently measured tool rotation orientation during normal drilling allows the antenna to generate a magnetic dipole moment that may be directed at any three dimensional angle and from a common origin point at the centroid of the antenna.

19 Claims, 8 Drawing Sheets

STEERABLE MAGNETIC DIPOLE ANTENNA FOR MEASUREMENT WHILE DRILLING APPLICATIONS

FIELD OF THE INVENTION

This disclosure is directed toward a robust, steerable, magnetic dipole antenna for Measurement-While-Drilling (MWD) or Logging-While-Drilling (LWD) applications.

BACKGROUND OF THE INVENTION

A measurement of electromagnetic (EM) properties of earth formation penetrated by a borehole has been used for decades in hydrocarbon exploration and production operations. The resistivity of hydrocarbon is greater than saline water. A measure of formation resistivity can, therefore, be used to delineate hydrocarbon bearing formations from saline water bearing formations. Electromagnetic borehole measurements are also used to determine a wide range of geophysical parameters of interest including the location of bed boundaries, the dip of formations intersecting the borehole, and anisotropy of material intersected by the borehole. Electromagnetic measurements are also used to "steer" the drilling of the borehole.

Borehole instruments, or borehole "tools", used to obtain EM measurements typically comprise one or more antennas or transmitting coils which are energized by an alternating electrical current. Resulting EM energy interacts with the surrounding formation and borehole environs by propagation or by induction of currents within the borehole environs. One or more receivers respond to this EM energy or current. A single coil or antenna can serve as both a transmitter and a receiver. Parameters of interest, such as those listed above, are determined from the response of the one or more receivers. Response of one or more receivers within the borehole apparatus may be telemetered to the surface of the earth via conveyance means that include a wireline or a drill string equipped with a borehole telemetry system; such as mud pulse, sonic or electromagnetic telemetry. Alternately, the response of one or more receivers can be stored within the borehole tool for subsequent retrieval at the surface of the earth.

Standard induction and wave propagation EM tools are configured with transmitter and receiver coils with their magnetic moments aligned with the major axis of the tool. More recently, induction tools with three axis coils and wave propagation MWD or LWD tools with antennas (coils) whose magnetic moments are not aligned with the tool axis are being produced and used. These MWD or LWD propagation tools, with antenna dipole axes tilted with respect to the tool axis, can locate boundaries with resistivity differences as a function of tool azimuth. Tools with coils aligned with the tool axis cannot locate boundaries with resistivity changes as a function of tool azimuthal angle. The azimuthal resistivity response feature of an electromagnetic MWD or LWD tool is most useful in direction or "geosteering" the drilling direction of a well in a formation of interest. More specifically, the distance and direction from the tool to a bed (such as shale) bounding the formation of interest, or water interfaces within the formation of interest, can be determined from the azimuthal resistivity response of the tool. Using this information, the drill bit can be directed or "steered", in real time, to stay within the formation zone of interest so as to avoid penetrating non hydrocarbon bearing formations with the borehole.

Prior art MWD or LWD tools that make azimuthal EM measurements employ a combination of separate axially aligned antennas and antennas whose magnetic moments are tilted at an angle with respect to the tool axis. Such tools, for example, are described in U.S. Pat. No. 6,476,609 issued to Bittar, and U.S. Pat. No. 6,297,639 issued to Clark et al. These tools have a fixed inclination and azimuth response, and can only transmit or receive magnetic fields at a particular orientation relative to the tool. These patents include a rotational position sensor and a processor to identify the azimuthal angle of the magnetic moments as the tool rotates during drilling. Furthermore, the antennas with different dipole orientations located at different axial spacings along the length of the tool lack a common dipole origin point. This fact precludes vector addition of the dipole moments to form a new dipole moment, in any direction, with the same origin point. Multiple antennas at differing axial spacings also increase tool production and maintenance cost, and further reduces mechanical tool strength.

Electromagnetic antennas have been designed for MWD or LWD tools for the past three decades. The use of highly magnetic permeable material in the design of these antennas has been around for the past two decades and antennas which generate a magnetic field in directions other than the tool axis directions have been designed mostly in the past decade. U.S. Pat. No. 4,536,713 issued to Davis et al. describes a high permeability magnetic material disposed in a drill collar used for measuring mud resistivity outside the collar in the annulus region between the drill collar and the borehole wall. U.S. Pat. No. 5,138,263 issued to Towle describes placing magnetic material between an antenna wire and an MWD collar to electromagnetically couple the antenna signal to the formation.

U.S. Pat. No. 6,181,138 issued to Hagiwara describes an arrangement of three antennas disposed around a drill collar in which each antenna is composed of a coil wire disposed within a plane and oriented at an angle with respect to the tool axis. Each of the three antennas is basically a wire around the outside of a usually steel drill collar, wherein the path of the wire is located in a plane intersecting the drill collar. The normal vector to this plane can be described as having an inclination angle and an azimuthal angle. Azimuthal angle as it is being used here is the angle around the tool perpendicular to the tool axis. The origin of the vector is the center of the plane containing the antenna. All of the three antennas have the same centroid or geometric center and, as such, produce magnetic vectors which have a common origin or are co-located. The patent also describes on the same tool additional antennas spaced apart along the tool axis and oriented at a second angle with respect to the tool axis. The additional antennas are disposed within a plane which makes an angle of zero degrees in the same manner that standard wave propagation resistivity tools are constructed. The patent also discloses using the antennas in combination with a rotational position sensor and a processor contained within the MWD tool. The patent also describes combining the three antennas to electrically orient the antenna magnetic dipole moment to any azimuthal angle, but cannot change the inclination angle. This antenna design places coils around a drilling collar in a region of reduced diameter or "necked down" region. It is well known in the art that reducing the outer diameter of a drilling collar weakens it in that area and causes the collar to be more prone to mechanical failure. In this design also the coils must be covered with a non-conducting layer which must go all the way around the collar for the extent of the tilted coils. Non-conductive coverings presently used in the art such as fiberglass, rubber, epoxy, ceramics or plastic are subject to wear due to abrasion which occurs between the tool and the borehole wall, and are not as strong as the collar material. Because the non-conducting region must encircle the collar it is likely to contact the borehole wall unless the collar is further "necked down" causing further weakness. An extreme penalty is paid by "necking down" drilling tubulars. It is well known to those skilled in the art that reducing the outer diameter of a cylindrical member reduces the torsional and bending stiffness proportional to the forth power of the radius. For example, reducing the diameter of a 5 inch (12.7 centimeter) tubular to 4 inches (10.2 centimeters) reduces the torsional and bending stiffness by 59%.

U.S. Pat. No. 6,476,609 issued to Bittar describes at least one antenna disposed in a plane and oriented at an angle with respect to the tool axis and another antenna displaced along the tool axis from the first antenna and disposed in a plane and oriented in a different angle with respect to the tool axis. This patent also includes a rotational position sensor and a processor.

U.S. Pat. No. 7,038,457 issued to Chen and Barber, and U.S. Pat. No. 3,808,520 issued to Runge, describe co-located triaxial antenna construction in which three orthogonal coils are wound around a common point on a borehole logging tool. These patents describe the virtues of having antennas with three orthogonal dipole moments all passing through the same point in the center of the logging tool. The teachings of both patents are more suitable for tools conveyed into a borehole by wireline, rather than tools used in drilling a borehole, because the disclosed coil windings would compromise the strength and durability of an MWD or LWD tool. Runge describes a triaxial antenna located in the center of a tool with non-conducting tool housing or "mandrel" around it. This design is clearly not appropriate for MWD or LWD embodiment. It is known to those of ordinary skill in the MWD or LWD art that a non-conducting tool body does not have the strength to support the severe mechanical requirements of tools used in drilling. Chen and Barber describe a technique for implementing an antenna structure with co-located magnetic dipole moments in which the transverse coils penetrate a mandrel through openings in the tool body. While this may be appropriate for wireline applications, openings in the tool body in which a coil is placed will cause weakness in the tool body. In addition provision must be made for drilling fluid or drilling "mud" to flow down within the body of an MWD or LWD tool. This mud usually flows in a conduit or channel in the center of the MWD or LWD tool, which is typically a drill collar. Embodied in a MWD or LWD system, the Chen and Barber design must somehow be modified to divert the mud away from the coils and the openings in the tool body thereby adding complexity and cost to the manufacture of the tool. Another problem encountered in embodying the Chen and Barber design as an MWD or LWD system is that, owing to the required non-conductive covering which is disposed around the circumference of the tool, the coils are not protected from abrasion which occurs between the tool and the borehole wall during drilling.

A more robust antenna design suitable for MWD or LWD application is described in U.S. Pat. No. 5,530,358 issued to Wisler et al. This antenna is integrated into a drilling tubular affording maximum strength and abrasion resistance, One of the key components of the Wisler et al. system is the antenna is composed of grooves and wire pathways disposed beneath the surface of the drilling tubular surface to avoid any abrasion and so as not to reduce the strength of the tubular. The patent further discloses disposing magnetic material between the wire and the grooves.

U.S. Pat. No. 7,057,392 issued to Wang et al describes an antenna with grooves on the outside of the tool that are oriented "substantially orthogonal to the tool axis". The antenna construction and grooves are similar to those described in U.S. Pat. No. 5,530,358.

SUMMARY OF THE INVENTION

The present invention describes a robust, steerable, magnetic dipole antenna for Measurement-While-Drilling (MWD) or Logging-While-Drilling (LWD) applications. The antenna elements use a hole arrangement in addition to grooves in a steel tool body, which is typically a drill collar. This antenna embodiment produces an extremely robust, antenna that does not significantly reduce the structural integrity of the tool body in which it is disposed. The antenna embodiment is also wear resistant in harsh MWD or LWD environments, as will be illustrated in detail in subsequent sections of this disclosure. Also the resultant magnetic dipole generated by this antenna is not generated by a wire disposed in a single plane as the prior art and is thereby electrically steerable in inclination angle from a common origin. A variable dipole moment inclination angle combined with independently measured tool rotation orientation during normal drilling allows the antenna to generate a magnetic dipole moment that may be directed at any three dimensional angle and from a common origin point at the centroid of the antenna. In the context of this disclosure, "inclination angle" is the angle that the antenna magnetic dipole moment forms with the tool axis.

As mentioned previously, the antenna elements including antenna wires are disposed within both recesses or "grooves" and within tunnels or "holes" in the wall of the tool body. In both types of elements the wires are in close proximity with soft ferromagnetic material. The grooves are used on the part of the antenna where antenna wire is substantially perpendicular to the major tool axis. The grooves are similar to those described in previously mention U.S. Pat. No. 5,530,358, which is herein entered into this disclosure in its entirety by reference. The holes are used on the part of the antenna where antenna wire is substantially parallel to the tool axis and in a preferred embodiment the holes are substantially perpendicular to the tool axis. As is well known in the MWD industry, most wear takes place due to the rotation of the MWD tools in the borehole, and as such scoring and wear takes place in a plane roughly perpendicular to the tool axis. In general, non-conducting materials used to cover antenna elements are not as resistant to wear and gouging as steel and other conductors. For this reason, grooves that go around the periphery of the tool body and are covered with non-conducting material are much more likely to be destroyed than are grooves that are covered in non-conducting material and which are essentially parallel to the tool body. The present invention uses a more robust hole element design instead of groove elements for the elements that are essentially perpendicular to the tool axis.

The groove antenna elements of this disclosure comprise soft ferromagnetic material covered by a non-conducting material. The hole elements are filled with soft ferromagnetic material and are oriented at an angle to the tool axis. In a preferred embodiment holes are oriented substantially perpendicular to the tool axis.

Although the antenna array is disclosed as being embodied in a MWD or LWD logging system, it should be understood that concepts of the antenna can be applied to any system that rotates within a well borehole.

BRIEF DESCRIPTION OF THE DRAWINGS

So that the manner in which the above recited features and advantages of the present invention are obtained and can be understood in detail, a more particular description of the invention, briefly summarized above, may be had by reference to the embodiments thereof which are illustrated in the appended drawings.

FIG. 1b shows a side view of the of the tool housing of FIG. 1a;

FIG. 5b illustrates conceptually the results of borehole wear on the antenna hole shown in FIG. 5a;

FIG. 14a shows conceptually a net surface current flowing on the outside surface of the tool resulting from the operation of hole antenna elements; and.

DETAILED DESCRIPTION OF THE PREFERRED EMBODIMENT

The present invention describes a robust, steerable, magnetic dipole antenna for 10 kilohertz (kHz) to 10 megahertz (MHz) Measurement-While-Drilling (MWD) or Logging-While-Drilling (LWD) applications. The antenna elements comprise one or more antenna "hole" elements in addition to one or more antenna "groove" elements in a steel tool body, which is typically a drill collar. This embodiment produces an extremely robust antenna that does not significantly reduce the structural integrity of the tool body in which it is disposed. The antenna embodiment is also relatively wear resistant to the harsh MWD or LWD environments. For brevity, both MWD and LWD systems will be referred to as "MWD" systems.

Using antenna hole elements perpendicular to the tool axis only, a magnetic field can be generated or received perpendicular to the major axis of the tool. Using groove elements parallel to the tool axis only a magnetic vector can be generated or received parallel to the major azis of the tool. Using both hole and groove antenna elements, a magnetic field may be generated or received at any inclination angle. This variable inclination, combined with an independent measure of tool azimuthal orientation during rotation, provides the ability to transmit or receive electromagnetic fields with magnetic vectors in any direction. This measurement can subsequently be used to steer the direction of the MWD system during a drilling operation.

Operational Wear Patterns in MWD Logging Tools

In order to fully understand the advantages of the present invention, it is instructive to examine operational wear patterns of MWD logging tools.

Figure 1A:
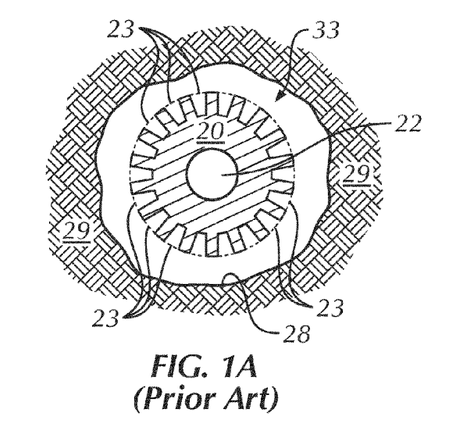
FIG. 1a shows an azimuthal cross section view of a tool housing comprising antenna grooves.
Figure 1B:
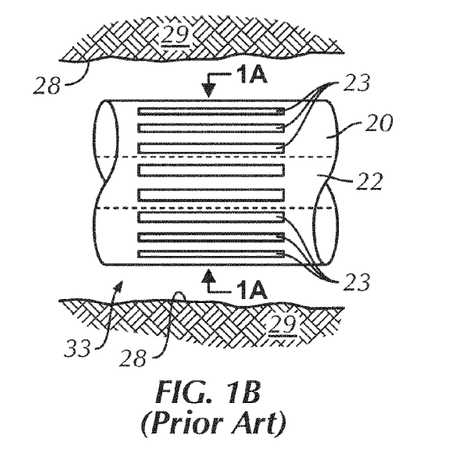

FIGS. 1a and 1b show antenna recesses or "grooves" configuration used in U.S. Pat. No. 5,530,358, which has been entered into this disclosure by reference. These grooves are parallel to the major axis of the logging tool. FIG. 1a shows an azimuthal cross section view at A-A of a tool housing 20 for the steerable dipole antenna section of a MWD tool. Grooves 23 are disposed azimuthally around the outer surface of the tool housing 20. The azimuthal spacing is preferably equal. As mentioned previously, the tool housing 20 is preferably a drill collar comprising a conduit 22 through which drilling fluid flows. The tool housing 20 is shown disposed within a borehole 33 defined by a borehole wall 28 and penetrating an earth formation 29. FIG. 1b shows a side view of the of the tool housing 20, and clearly shows a "set" of grooves 23, with each groove being essentially parallel to the major axis of the tool housing 20. Each groove is, therefore, essentially parallel to the major axis of the MWD logging tool. The axial position of each groove in the set is preferably the same along the tool body 20.

Figure 2A:
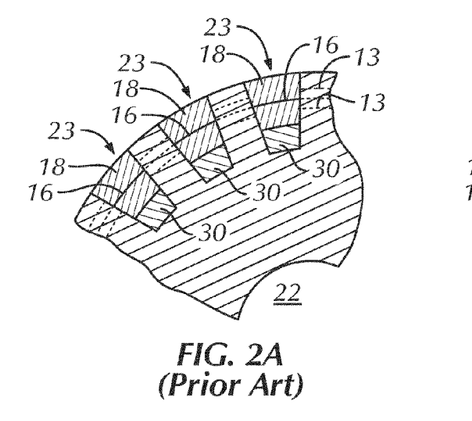
FIG. 2a is a cross sectional view of the wall of the tool housing illustrating elements of an antenna within two exemplary grooves parallel to the axis of the tool housing.

FIG. 2a is a cross sectional view of the wall of the tool housing 20 illustrating elements of the antenna within two exemplary grooves 23 from the set of grooves shown in FIGS. 1*a* and 1*b*. The radially inward or "bottom" portion of each groove comprises ferromagnetic material 30. The radially outward or "top" of each groove comprises non-conducting material 18. Antenna wire 16 traverses the non-conducting material in a direction that at any point is essentially perpendicular to the major axis of the tool housing 20. Antenna wire within the wall of the tool housing 20 between grooves, disposed in a wireway 13, is indicated by broken lines. Details of the wireway 13 are disclosed in U.S. patent application Ser. No. 11/685,046 filed Mar. 12, 2007 and assigned to the assignee of the present invention, which is entered into this disclosure in its entirety by reference. FIG. 2*a* illustrates the geometry of the antenna before the tool housing 20 has experienced wear within the well borehole.

Figure 2B:
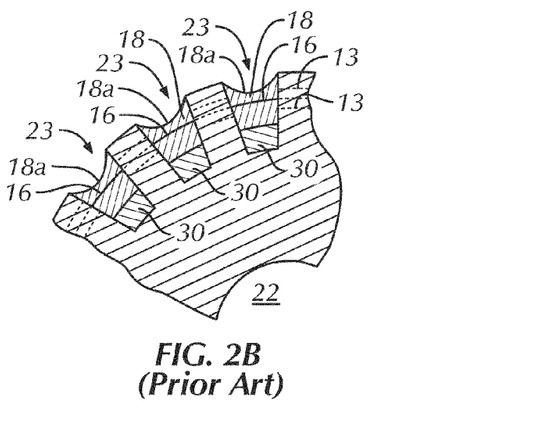
FIG. 2b shows conceptually the effect of wear on the grooves shown in FIG. 2a due to downhole rotation of the tool housing within a borehole.

FIG. 2*b* shows conceptually the effect of wear on the grooves 23 shown in FIG. 2*a* due to downhole rotation of the tool housing 20 within a borehole. Part of the non-conducting covering 18 has been worn away as illustrated by the curvature of surface 18*a*. Some non-conducting material does, however, remain in contact with the ferromagnetic material and the antenna wire 16 remains intact. This wear pattern has no adverse effect on the antenna performance.

Figure 2C:
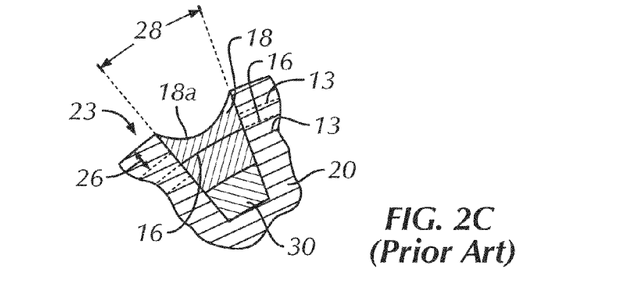
FIG. 2c shows an enlarged view of a single worn groove that is parallel to the tool axis.

FIG. 2*c* shows an enlarged view of a single worn groove 23 that is essentially parallel to the tool axis, and with a wear depth 26 approximately equal to the groove width 28. As a general rule, it has been found that under normal operating conditions, the radial depth 26 of non-conducting material 18 that will be worn away is approximately equal to the width 28 of the groove. Based upon this finding, the radial depth 26 of a groove is made greater than the azimuthal width 28 of the grooves. For the antenna of this disclosure, dimensions of grooves 23 are approximately 0.25 inches (0.64 centimeters) wide and at least twice as deep. With these relative dimensions, the non-conducting material 18 disposed within in the groove will only be worn approximately the same 0.25 inches (0.64 centimeters) or less leaving sufficient non-conducting material and the antenna wire to insure normal operation of the antenna.

Figure 3A:
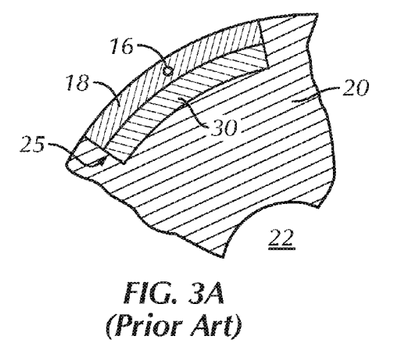
FIG. 3a is a cross sectional view of the wall of the tool housing illustrating elements of a prior art antenna groove perpendicular to the axis of the tool housing.
Figure 3B:
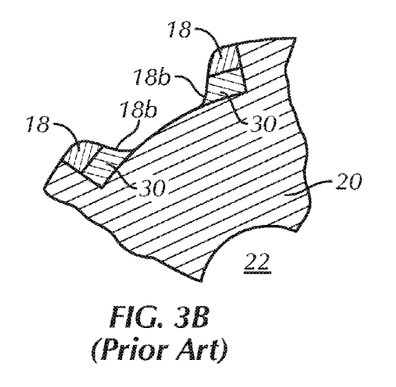
FIG. 3b shows conceptually the effect of wear on the prior art groove shown in FIG. 3a due to downhole rotation of the tool housing within a borehole.
Figure 3C:
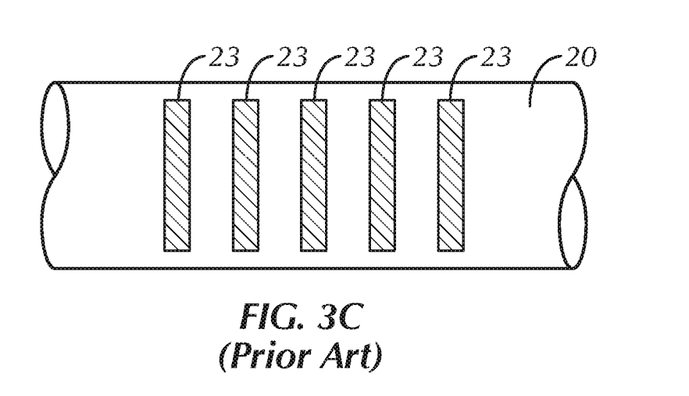
FIG. 3c shows a side view of prior art grooves oriented perpendicular to the major axis of the tool housing.

The wear pattern of grooves oriented perpendicular to the major axis of the tool, and therefore oriented in the direction of tool rotation, are next examined. Wear patterns in grooves oriented perpendicular to the tool axis can be catastrophic to the operation of the antenna. FIG. 3*c* shows a side view of prior art grooves 23 oriented perpendicular to the major axis of the tool 20. FIGS. 3*a* and 3*b*, which are cross sectional views of the grooves in FIG. 3*c* oriented perpendicular to the tool axis, are used to illustrate conceptually these wear patterns. More specifically, FIG. 3*a* shows the ferromagnetic material 30, the non-conductive covering material 18, and the antenna wire 16 disposed within a "azimuthal" groove 25 before downhole use. FIG. 3*b* shows elements within the same groove 25 after the tool has been rotated within the borehole. The wear contour is illustrated by the surface 18*b*. Both the non-conducting material 18 and the ferromagnetic material 30 have been worn away along with the antenna wire 16 imbedded within the nonconducting material. Stated another way, FIG. 3*b* illustrates the catastrophic effect of wear when the dimension of the groove in the direction of rotation is much larger than the depth of the groove. A wear pattern illustrated conceptually in FIG. 3*b* obviously renders the antenna inoperable.

Holes for Antenna Elements Perpendicular to the Tool Axis

In order to avoid catastrophic wear patterns of antenna elements oriented perpendicular to the tool axis, a new type of antenna element is employed. These elements comprise drilled holes filled with ferrite and a thin saw cut or "slit" along the hole length. Within the context of this disclosure, the term "hole antenna element" refers to a part of the tool comprising a tunnel or hole within the wall of the tool whose center is a chord in a cylindrical section of the tool, a slit extending from the hole to the outer surface of the tool, the outer surface of the tool in the vicinity of the slit, and an antenna wire element traversing the hole and located between the hole and the tool outer surface.

Figure 4A:
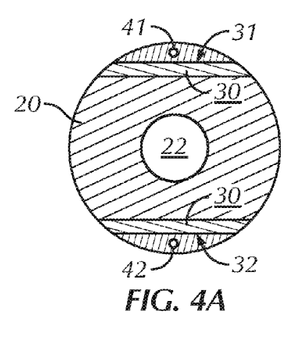
FIG. 4a is a radial cross sectional view of two antenna holes oriented with their major axes perpendicular to the tool housing axis.
Figure 4B:
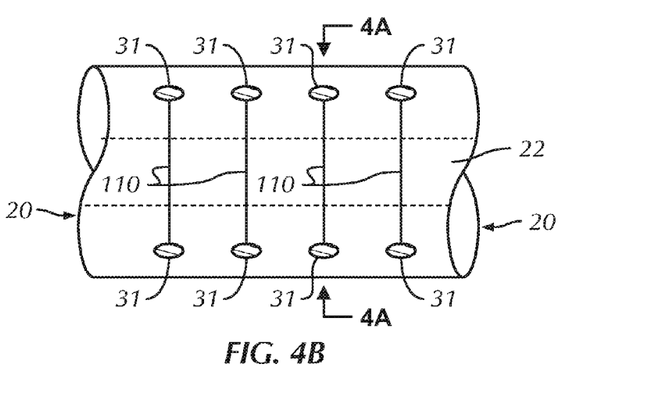
FIG. 4b illustrates an axial cross sectional view of the same tool housing shown in FIG. 4a comprising a plurality or "set" of axially spaced antenna holes.

FIG. 4*a* is a radial cross sectional view at A-A of two hole antenna elements or 31 and 32 oriented with their major axes perpendicular to the tool housing axis, traversing the wall of the tool housing 20, and azimuthally spaced at 180 degrees. The major axis of each hole is also preferably perpendicular to the radius of the tool housing 20. The holes 31 and 32 contain ferromagnetic material 30 such as ferrite. Corresponding antenna wires are denoted by 41 and 42, respectively. The conduit through which drilling fluid flows is again denoted by 22. FIG. 4*b* illustrates a side view of the same tool housing 20 comprising a plurality or "set" of axially hole antenna elements, the openings of the holes are denoted by 31. Hole antenna elements 32 (see FIG. 4*a*) are on the opposite side of the tool housing 20 and, therefore, are not shown in FIG. 4*b*. The thin saw cuts or "slits" which intersect the holes along their length are denoted by 110. The slits 110 are filled with non-conductive wear resistant material that will be subsequently discussed in more detail. The axial spacing of the elements in the set is preferably equal.

Figure 4C:
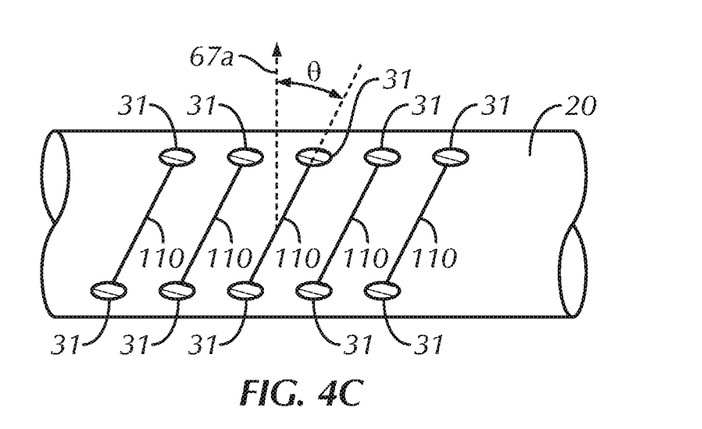
FIG. 4c is a side view of an alternate embodiment of the antenna elements showing a set of antenna elements where holes and slits are positioned at an angle Φ that is not perpendicular to the major axis of the tool.
Figure 4D:
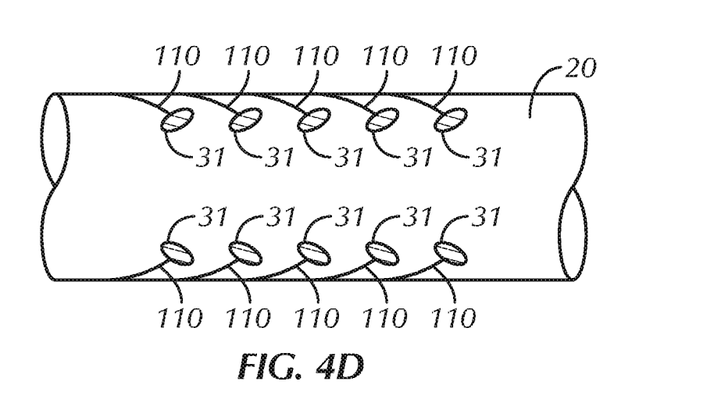
FIG. 4d is a side view of the alternate embodiment of the antenna elements showing portions of opposing antenna elements where holes and slits are positioned at an angle Φ that is not perpendicular to the major axis of the tool.

An alternate embodiment of the antenna hole elements is shown in FIGS. 4*c* and 4*d* in which the holes and slits are positioned at an angle Φ at 67 that is not perpendicular to the major axis of the tool 20. In this case the hole part of each hole elements, indicated by openings 31 and 32, are located along a chord of elliptical conic sections of the tool body, wherein the planes defining the conic sections are not perpendicular to the tool axis. More specifically, FIG. 4*c* illustrates a side view of the set of hole elements 32, and FIG. 4*d* is a side view showing portions of the sets of opposing hole elements 32 and 32. This embodiment will provide a magnetic vector that is not perpendicular to the major axis of the tool 20, but makes an angle Φ with the perpendicular vector 67*a* as shown in FIG. 4*c*. In this manner, the antenna generates or detects a field component in the perpendicular direction 67*a* as well as a component in the axial direction of the major axis of the tool 20. Although not show one familiar with the art of antenna design will realize that the hole elements can have different tilt angles, Φ, and can be located at different azimuthal locations relative to one another in order to achieve alternate embodiment antennas with differing characteristics.

Figure 5A:
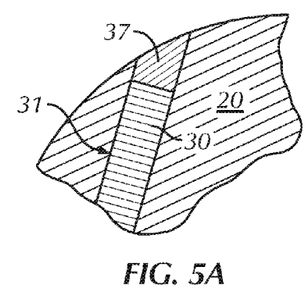
FIG. 5a illustrates a more detailed view of an antenna hole perpendicular to the axis of the logging tool.

FIG. 5*a* illustrates a more detailed view of one end of a single hole element 31 perpendicular to the axis of the logging tool 20. The hole 31 is preferably a round conduit, although other shapes can be used. The azimuthally spaced hole elements 32 (see FIG. 4*a*) are identical to the hole element 31. In the present embodiment of the steerable dipole antenna system, openings of the holes are essentially round holes approximately 0.25 inches (0.64 centimeters) in diameter. The holes contain ferromagnetic material 30 and are terminated at each end (only one end shown) by non-conducting inserts 37. The ferromagnetic material 30 is recessed at least 0.25 inches (0.64 centimeters) from the outer surface of the tool housing 20. The slits 110 (see FIG. 4*b*) are very thin and preferably less than 1/16 inch (0.16 cm) wide so that they will not erode during drilling.

Figure 5B:
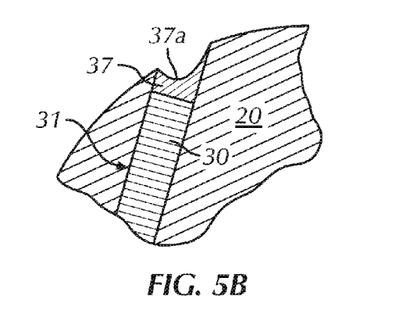

FIG. 5b illustrates conceptually the results of borehole wear on the ends of the hole element shown in FIG. 5a. The wear of the non-conducting insert 37 is illustrated by the contour of the surface 37a. As discussed above, if the diameter of the hole is 0.25 inches (0.64 centimeters) or less, and the radial length of the non-conducting insert is greater than 0.25 inches (0.64 centimeters), the depth to which the insert erodes is 0.25 inches (0.64 centimeters) or less, and does not damage the operation of the antenna.

Configuration of the Steerable Magnetic Dipole Antenna Tool Section

Figure 6:
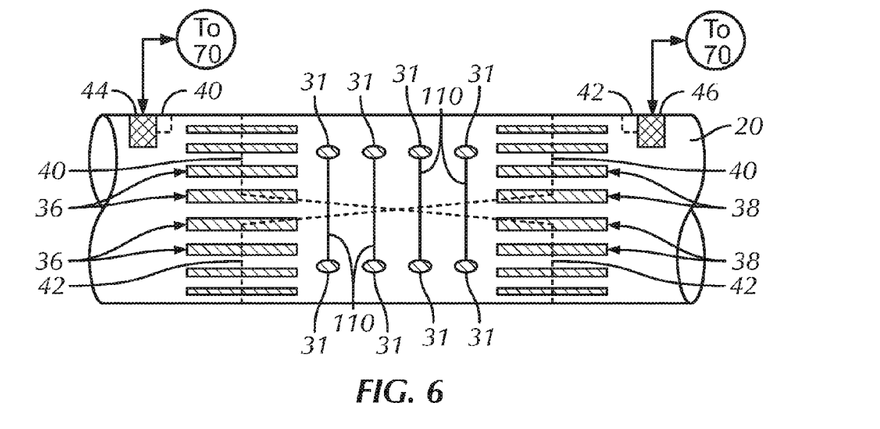
FIG. 6 is a side view of the exterior of a MWD logging tool section housing a steerable magnetic dipole antenna.

FIG. 6 is a side view of the exterior of a MWD logging tool section 20 housing a preferred embodiment of the steerable magnetic dipole antenna. The antenna comprises a first set 36 and a second set 38 of axially grooved and axially spaced antenna elements. The grooves in each set 36 and 38 are essentially parallel to the major axis of the tool section 20, and are azimuthally disposed peripherally around the outer surface of the housing 20 (see FIGS. 1a and 1b). Sections of antenna wires 40 and 42, which are perpendicular to the axis of the tool section 20, traverse each groove set 36 and 38. Sections of antenna wires 40 and 42 also traverse tool housing material between grooves within wireways (not shown). Wireways housing antenna wires are described in detail in U.S. patent application Ser. No. 11/685,046 which has been entered into this disclosure by reference. Broken lines represent the antenna wires beneath the outer surface on the tool 20.

Again referring to FIG. 6, a first set or transversally directed hole antenna elements are shown with hole openings 31. A second set of hole antenna elements with hole openings 32 (see FIG. 4a) is disposed on the other side of the tool displaced by 180 degrees of azimuth angle and, therefore, not shown in this view. These transverse hole elements (see FIGS. 4a and 5a) are disposed axially between the first and second sets of axial grooves 36 and 38, respectively. The dotted lines represent sections of the antenna wires 40 and 42 disposed in non-conducting material or within in wireways (see FIGS. 2a-2c) within the wall of the tool section 20. Axial portions of the antenna wires 40 and 42, which are portions parallel to the axis of the tool section 20, are disposed within in a common wireway and are disposed above the ferrite in the holes as shown in detailed FIGS. 13a and 13b. Slits between the holes are again denoted as 110. The ends of the antenna wires 40 and 42 terminate at antenna wire connection boxes 44 and 46, respectively. The antenna wire connection boxes serve as terminals through which the antenna wires 40 and 42 are connected electrically with power supplies, control electronics, and the telemetry system of MWD logging tool. This connection is indicated conceptually as "To 70", and will be subsequently discussed in more detail.

Figure 7:
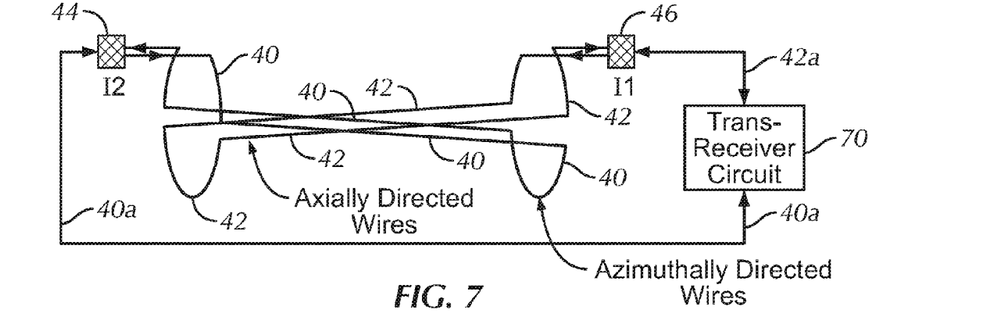
FIG. 7 is a perspective wiring diagram of antenna wires used in the steerable magnetic dipole antenna shown in FIG. 6.

FIG. 7 is a perspective wiring diagram of the antenna wires 40 and 42 that traverse the first and second sets of groove antenna elements 36 and 38, respectively, and over the hole elements indicated by openings 31 and 32. (see FIGS. 13a and 13b for details) The leads 40a and 42a connect the antenna wires 40 and 42, via the connection boxes 44 and 46, respectively, to transmission receiver circuit 70.

Circuit and Operation of the Steerable Magnetic Dipole Antenna

Conceptual Overview

Figure 8:
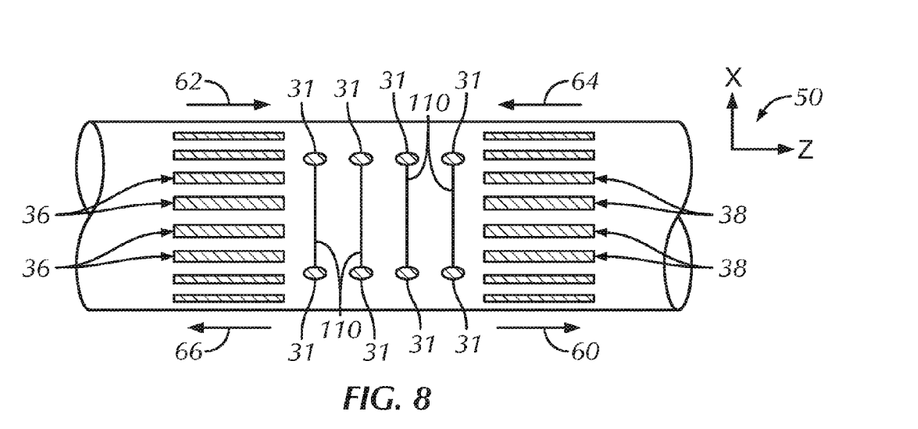
FIG. 8 shows the exemplary magnetic moment vectors generated by the antenna that are parallel to the axis of the tool housing.

Attention is directed to FIGS. 7 and 8. Currents I1 and I2 are supplied to, or generate by, the antenna wires 40 and 42 at wire connection boxes 44 and 46, respectively, depending upon whether the antenna is operating as a transmitter or receiver. An understanding of how the steerable magnetic dipole antenna operates can be seen by assuming that the antenna is in a transmission mode. The currents I1 and I2 are adjusted to obtain said magnetic moment vector in a predetermined direction. When the axial elements 36 and 38 are activated, there results a magnetic vector in the Z direction, where Z is coincident with the major axis of the tool section 20 as indicated at 50. When the transverse elements 31 and 32 are activated, there results a magnetic vector in the X direction, where X is perpendicular to the major axis of the tool section 20. The antenna may be used as a transmitter or as a receiver.

An understanding of how the steerable magnetic dipole antenna operates can be seen by assuming that the antenna is operating in a transmission mode. Using the transmitter-receiver circuit 70, the currents I1 and I2 are therefore controlled to direct the magnetic vector from the Z direction, or from the X direction, or all inclination angles there between in the X-Z plane. As an example, when I1=I2 in the wiring diagram shown in FIG. 7, the net current in the axially directed wires 40 and 42 is zero and there is, therefore, no net current to activate the transverse hole element sets 31 and 32. The net currents go around the periphery of the tool section 20 in the sections of wires 40 and 42 that activate the axially grooved antenna element sets 36 and 38. The net result is a magnetic vector directed in the Z or "axial" direction. When the currents are controlled such that I1=−I2, the currents in the transverse elements 31 and 32 are 2×I1, and these elements are activated to produce a magnetic vector in the X direction. Also when I1=−I2, currents in the antenna wires activating the axial groove elements 36 and 38 produce field vectors which cancel.

By reference to FIG. 8, the resulting magnetic vectors are shown. Two vectors 60 and 62 are in the plus Z direction and two vectors 64 and 66 are in the minus Z direction, with the net magnetic dipole moment being zero. The inclination angle may be adjusted by varying the I1 and I2 currents, as will be detailed in the following section. Note that the slits are again denoted as 110.

Circuit and Operation Details

Figure 9:
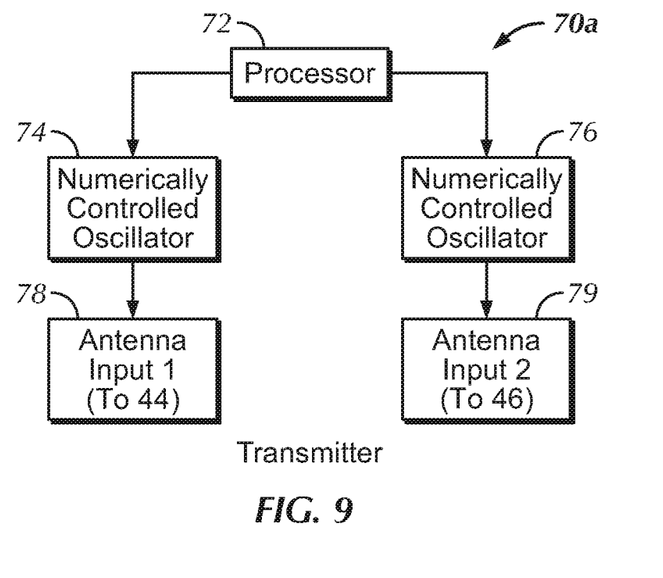
FIG. 9 shows a flow diagram comprising the major antenna transmission elements.
Figure 10:
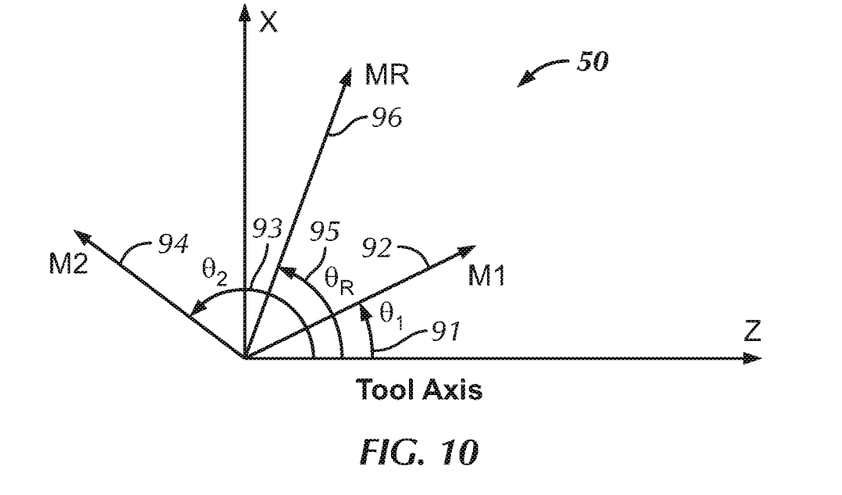
FIG. 10 shows magnetic moments M1 and M2 generated by currents I1 and I2 in the antenna in addition to the resultant magnetic moment of the antenna MR.

FIG. 9 shows a flow diagram comprising the major antenna transmission elements 70a of the transmitter-receiver circuit 70. Operating as a transmitter, a processor 72 sends data to two oscillator based transmitter circuits 74 and 76, which create two antenna input signals. The oscillators are numerically controlled to adjust the input signals to specified frequency, phase, and amplitude. These input signals are the previously discussed antenna input currents I1 and I2, which are indicated conceptually at 78 and 79, respectively. The currents I1 and I2 are input to the antenna at the same frequency via the antenna wire connection boxes 44 and 46. The phase and amplitude of each individual antenna input is adjusted via the numerically controlled oscillators 74 and 76 to change the amplitude and inclination angle of the resultant antenna magnetic moment, which is a combination of the magnetic moments generated by the individual antenna current inputs. This process is stated mathematically below. Preferably mathematical computations are performed in the processor 72. It is also noted that some elements in the transmitter or receiver circuit 70 (See FIGS. 7 and 9) are used when the antenna is operated as a receiver, as will be subsequently discussed. An example of such an element is the processor 72, FIG. 10 is a graphical illustration of the component and resultant magnetic moments. The component magnetic moments M1 at 92 and M2 at 94 are generated by currents I1 and I2 in the antenna, which is operating as a transmitter.

The resultant magnetic moment of the antenna MR at 96 is the vector sum of the two components M1 and M2. Stated mathematically:

$$MR = M1 + M2$$

The angles θ1 at 91 and θ2 at 93 are the inclination angles that the component magnetic vectors M1 and M2, respectively, make with the tool axis, and may be represented by:

$$M1 = I1 \cdot C \begin{pmatrix} \cos(\theta 1) \\ \sin(\theta 1) \end{pmatrix}$$

and $$M2 = I2 \cdot C \begin{pmatrix} \cos(\theta 2) \\ \sin(\theta 2) \end{pmatrix}$$

C represents a conversion constant from current to magnetic moments for both the individual components. C, and the angles θ1 and θ2, are measured constants that are functions of the antenna structure and do not change. The resultant vector is therefore:

$$MR = C \begin{pmatrix} I1 \cdot \cos(\theta 1) + I2 \cdot \cos(\theta 2) \\ I1 \cdot \sin(\theta 1) + I2 \cdot \sin(\theta 2) \end{pmatrix}$$

where all terms on the right hand side of the equation are known or can be determined.

If it is required that the resultant magnetic moment MR be a constant 'K' independent of θ1, θ2, I1 and I2

$$|MR| = K$$

or $$[(I1 \cdot \cos(\theta 1) + I2 \cdot \cos(\theta 2)) \cdot C]^2 + [(I1 \cdot \sin(\theta 1) + I2 \cdot \sin(\theta 2)) \cdot C]^2 = K^2.$$

The tangent of the inclination angle θR between the tool axis (Z axis) and the resultant magnetic vector MR is:

$$\theta R = \operatorname{atan} 2(I1 \cdot \sin(\theta 1) + I2 \cdot \sin(\theta 2), I1 \cdot \cos(\theta 1) + I2 \cdot \cos(\theta 2))$$

where "atan 2" is the standard Fortran or C computer language notation for the arctangent function that has principal values from 180 degrees to −180 degrees. Given the known constants θ1 and θ2 and the required magnetic moment of the resultant K, the last two equations may be solved for I1 and I2 by standard, well known methods for any given steering angle θR. In particular if the antenna is constructed such that $$\theta 1 = \theta 2 = 45 \text{ degrees}$$

The above equations reduce to:

$$\theta R = \operatorname{atan} 2(I2 - I1, I1 + I2)$$

and $$(I1^2 + I2^2) \cdot C^2 = K^2$$

Figure 11:
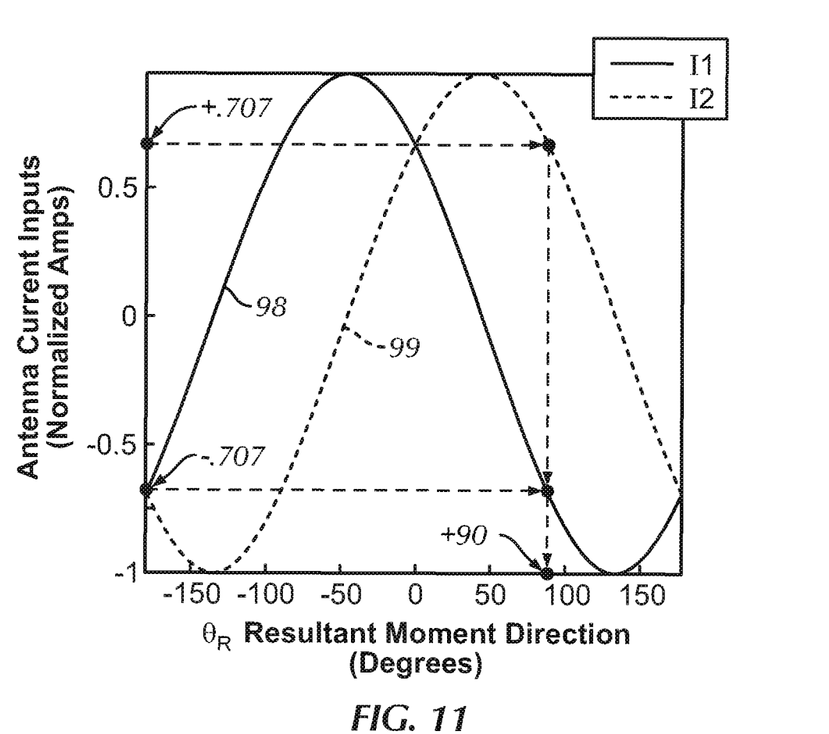
FIG. 11 shows the normalized antenna input currents I1 and I2 required to produce a resultant magnetic moment vector MR in any direction within the X-Z plane.

FIG. 11 shows the normalized antenna input currents I1 and I2 required to produce a resultant magnetic moment vector MR in any direction within the X-Z plane. More specifically, FIG. 11 shows a plot of antenna current inputs (ordinate) as a function of resultant moment direction θR (abscissa), with curve 98 representing input I1 and curve 99 representing input current I2. As an example, if I1=−0.707 amps and I2=+0.707 amps, θR=+90 degrees.

Figure 12:
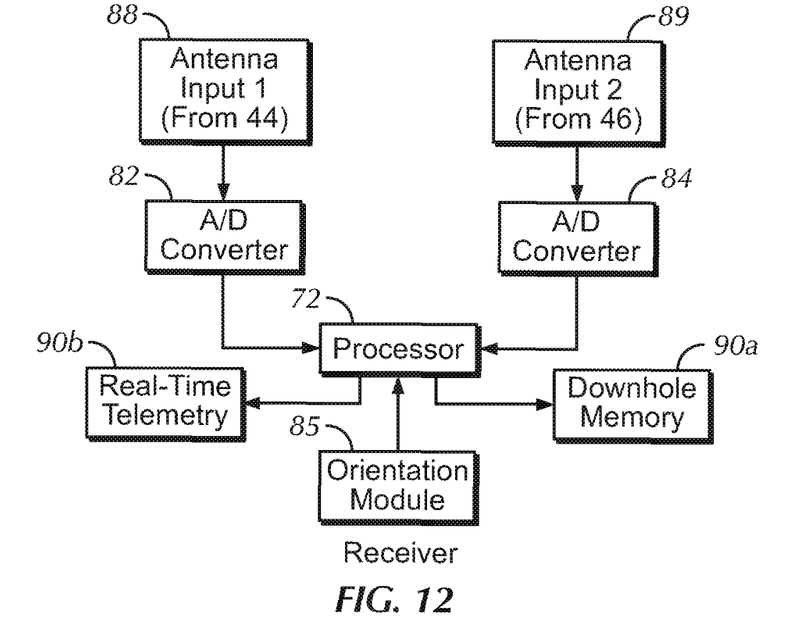
FIG. 12 shows a flow diagram comprising the major antenna receiver elements.

Previous discussion has been directed to the antenna operating as a transmitter. FIG. 12 shows a flow diagram comprising the major antenna receiver elements 70b of the transmitter-receiver circuit 70. When the operated as a receiver, the physical elements of the antenna are identical to the antenna operating as a transmitter. Input signals 88 and 89 from the antenna wires 40 and 42 (see FIGS. 6 and 7) are input via the antenna wire connection boxes 44 and 46 to a first analog to digital (A/D) circuit 82 and a second analog to digital (A/D) circuit 84, respectively. The A/D circuits 82 and 84 condition the respective input signals and then convert these signals to digital form. The digitized signals are input into the processor 72, which is preferably the same processor that is used in the transmitter portion (see FIG. 9) of the transmitter-receiver circuit 70. The processor 72 may preferably be a digital signal processor (DSP). The input signals are then processed and the phase and amplitude of each signal is computed. The two signals are then combined, preferably in the processor 72, to produce a single signal, which reacts only to a magnetic vector in a particular inclination angle direction in the X-Z plane. Results can then be stored in downhole memory at 90a or telemetered to the surface of the earth via a real time MWD telemetry system 90b. Alternately, measured or "raw" data may be stored in the downhole memory at 90a or telemetered to the surface of the earth for subsequent processing. Both methods of data storage and transmission are known in the art, and disclosed in previous disclosures entered into this disclosure by reference. In addition an orientation module 85, which senses the azimuthal angle that the antenna makes with the vertical or the "high side" of the borehole, is simultaneously input to the receiver computer. The orientation data are combined with the received signal data and placed into bins, wherein each bin contains received signal data received when the X-axis of the antenna is in a particular azimuthal direction. In this way the azimuthal orientation of the antenna data are known and the received data can be stored, transmitted, or processed as a function of azimuth. The orientation module may be composed of a 3 axis magnetometer and/or an inclinometer to sense high side of the hole relative to the earth coordinate system and electronics to relay this information to the receiver computer.

The procedure of data processing with the antenna operating as a receiver is the reverse of the procedure used in operating the antenna as a transmitter, and need not be detailed here. Briefly, the method involves combining the two signals from antenna input 1 and antenna input 2 in the proportion shown in FIG. 11. As an example, if the magnetic field vector to be measured is axially directed (Z direction), the signals from antenna input 1 and antenna input 2 shown at 88 and 89, respectively, would be processed by adding the two signals in phase to produce an output which is sensitive to the Z component of the field exciting the antenna.

Details of Hole Antenna Elements

Figure 13A:
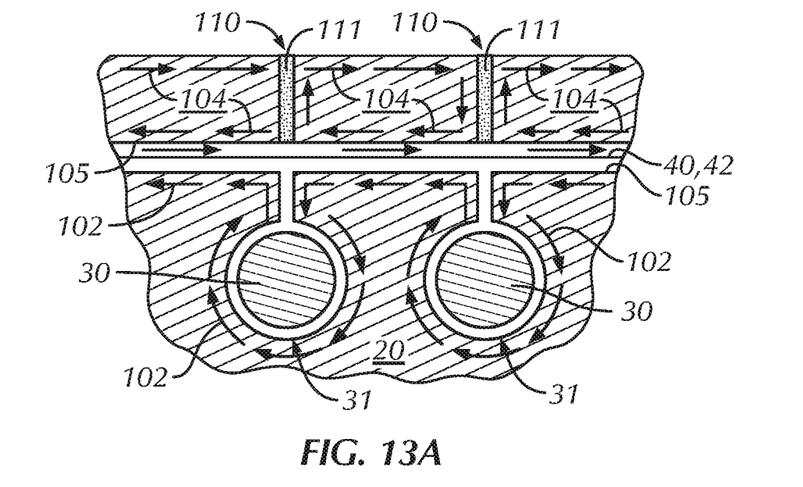
FIG. 13a shows a section view of the antenna elements in a plane containing the major axis of the tool.
Figure 13B:
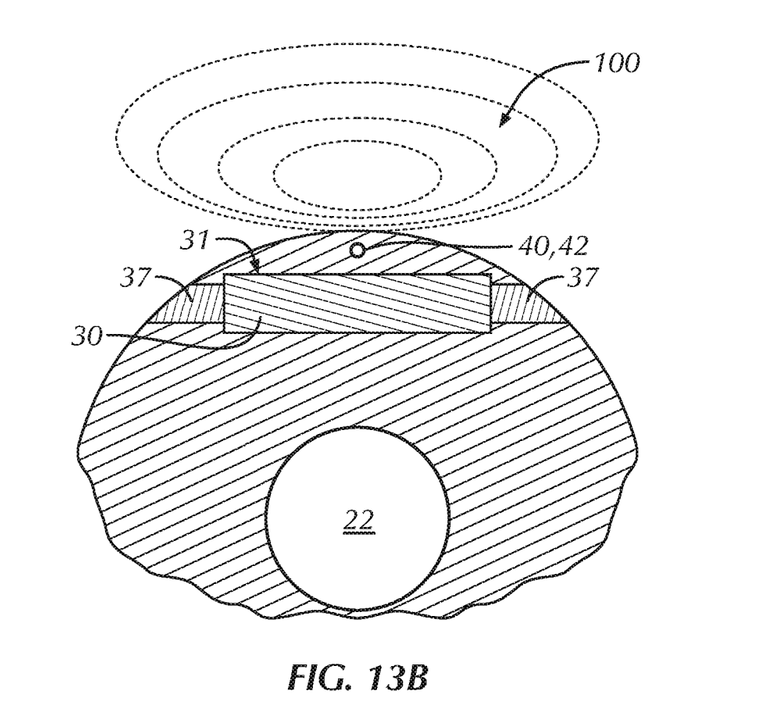
FIG. 13b shows a section of the "tunnel" of the hole antenna element in a plane whose normal vector is parallel to major axis of the tool.

Details of two hole antenna elements are shown in FIG. 13a and FIG. 13b. FIG. 13a shows a section view of the antenna elements in a plane containing the major axis of the tool 20, and FIG. 13b shows a section of the hole antenna element in a plane whose normal vector is parallel to major axis of the tool 20. The hole part of the hole antenna element is denoted by 31. Illustrations for hole antenna elements located 180 degrees of azimuth or on the other side of the tool are not shown but would be essentially the same. The drilling fluid conduit is again identified at 22. Referring first to FIG. 13a, preferably round holes 31 are drilled in a chord (i.e. a line segment connecting two points on a circle whose axis is coincident with the tool axis) and a ferrite rod 30 is centered within each hole. Referring to FIG. 13*b* as well as FIG. 5*a*, non-conducting inserts 37, preferably made of a hard plastic such as PEEK, are placed on either end to secure the rods 30 in place. Referring again to 13*a*, it can be seen that sections of antenna wires 40 and 42 are disposed in channels 105 below the exterior surface of the tool 20 perpendicular to the hole elements. The previously discussed thin slit 110 extends radially outward from each hole 31, perpendicularly bisects the antenna "feed" wire channel 105, and continues radially outward to the surface of the tool 20. This slit 110 is made very small and filled with non-conducting wear resistant material such as PEEK or a hard epoxy depicted at 111. The small width of the slit, less than $\frac{1}{16}$ inch (0.16 centimeters), prevents erosion to a depth which will interfere with the operation of the antenna. A net current is shown flowing in antenna wires 40, 42 from left to right by arrows. Within the context of this disclosure, the term "hole antenna element" refers to a part of the tool comprising a tunnel or hole 31 within the wall of the tool whose center is a chord in a cylindrical section of the tool, containing ferrite rod 30, a slit 110 extending from the hole to the outer surface of the tool, the outer surface of the tool in the vicinity of the slit, and an antenna wire element 40,42. Although two hole antenna elements are shown, the hole antenna array antenna may have additional elements depending on the required antenna gain. A feature of this invention is that the gain may be increased by enlarging the hole 31 and ferrite 30 diameter without changing other dimensions in the element.

The general operation of the hole array antenna creates or detects a localized surface current flowing axially on the tool exterior. By using surface currents rather than loop antennas which require a groove the outer surface of the tool 20, the present invention is much more robust. In operation as a transmitter a current is fed onto the antenna wire as shown by the arrow on the antenna feed wires 40 and 42. In reaction to this current, a secondary surface current, illustrated conceptually with the arrows 104, is induced into the channel 105 around the wire opposite in direction and nearly equal in magnitude. For a antenna frequencies greater than 100 kHz and for the conductivity of the steel tool body 20 greater than $1 \times 10^6$ Siemens per meter, the skin depth of the surface current will be less than 0.06 inch (0.16 centimeters). When the surface currents get to a slit, they must either go toward the surface of the tool 20 or toward the hole 31. The two paths offer differing impedances to the current flow. The path of the current 104 that goes to the surface of the tool is constrained to a rectangular path between adjacent antenna slits 110 as shown in FIG. 13*a*. The path of the current that goes toward the hole 31 must go down one side of the slit 110, loop around the ferrite rod 30, travel back up the opposite side of the slit 110 toward the outer surface of the tool 20, and continue along the wire pathway of the feed wires 40, 42. The current 102 which goes down to the hole is limited by the impedance of the loop around the ferrite rod 30 due to the inductance caused by the ferrite rod. The current which goes to the surface of the tool 20 is only limited by the impedance of the surface current in the rectangle. The surface current rectangle impedance is much less than the path around the ferrite rod, and so most of the current flows to the surface of the tool. When on the surface of the tool, the current 104 flows in an axial direction along the tool body in the same direction as the current in the antenna feed wire 40, 42. This surface current 104 produces magnetic field lines 100 shown in FIG. 13*b* which are perpendicular to the tool axis at the surface of the tool. The antenna design of the present invention does not require open grooves, but functions with elements comprising a hole 31 (or 32) and a small slit 110 in the surface of the tool 20. In the present invention, the elements are not a series of separate antennas but are interconnected by the surface currents to form a single antenna.

Figure 14A:
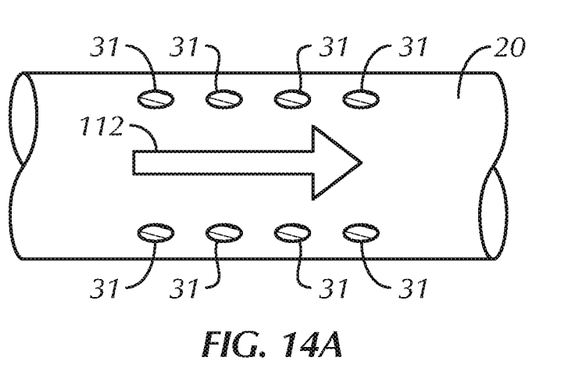
Figure 14B:
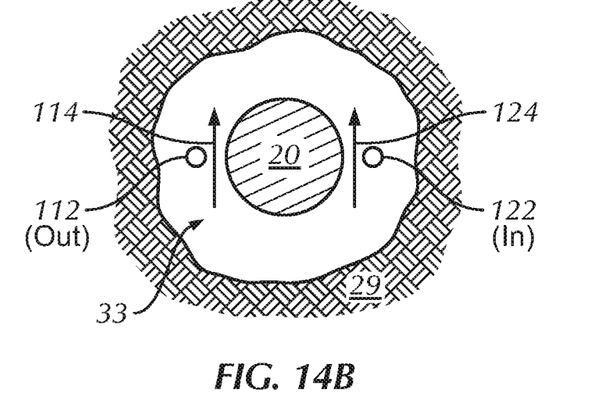
FIG. 14b shows a magnetic fields caused by surface current and another surface current on the other side of the tool going in the opposite direction.

The way in which the elements act together to generate a magnetic field vector can be seen by reference to FIGS. 14*a* and 14*b*, which illustrate hole antenna elements operating as a transmitter. FIG. 14*a* is a side view of the tool 20 and shows conceptually at 112 a net surface current flowing on the outside surface of the tool. There is another surface current flowing in opposite direction on the opposite surface of the tool 20 (see FIG. 14*b*). The current has been induced by the feed wire 40 or 42 shown in previous drawings. FIG. 14*b* is an end view of the tool 20 depicted in a borehole 33 penetrating formation 29. FIG. 14*b* illustrating conceptually the surface current 112 (shown in FIG. 14*a*) flowing "out" of the page, and further illustrates an opposing surface current 122 flowing "into" the page. Surface current 112 causes a field vector indicated by 114. Surface current 122 causes the field vector indicated at 124. The field current vectors 114 and 124 add together to yield a net vector that is perpendicular to the tool body and whose origin the geometric center of the tool.

It should be understood that an antenna can be made of hole elements alone without acting in concert with groove elements. In this case the antenna magnetic moment is not steerable in the XZ plane but has a constant azimuth angle other than zero. It should also be understood that the circuitry shown in FIGS. 9 and 12 can be used to operate one or more hole antenna elements. More specifically, the oscillator 74 or 76 shown in FIG. 9 can be used to apply a current to antenna wire 40 or 42 if the antenna is operated as a transmitter. Furthermore, the oscillator 74 or 76 is numerically controlled for adjusting said current to generate a magnetic field vector perpendicular to said major axis of the tool 20. If the antenna is operated as a receiver, the A/D converters 90*a* or 90*b* shown in FIG. 12 can be used to quantify current induced in the antenna by a magnetic field vector perpendicular to said major axis of said tool.

SUMMARY

The disclosure sets forth a robust, steerable dipole antenna suitable for MWD. Novel, robust, hole antenna elements have been disclosed which facilitate this end. The antenna can be operated as a transmitter or a receiver. Currents to the antenna array can be adjusted to obtain the desired antenna magnetic moment inclination vector. Using antenna hole elements only, a magnetic field vector is generated or received perpendicular to the major axis of the tool. Using both hole and groove antenna elements, inclination vector is generated or received in an X-Y plane as define in the disclosure. This inclination vector, combined with an independent measure of tool azimuthal orientation during rotation, yields a measure of tool orientation in three dimensions. This measurement can subsequently be used to steer the direction of the MWD system during a drilling operation.

While the foregoing disclosure is directed toward the preferred embodiments of the invention, the scope of the invention is defined by the claims, which follow.

What is claimed is:

1. A magnetic dipole antenna disposed in an antenna housing, the antenna comprising:

a first and a second set of grooved antenna elements, wherein said first and said second sets of grooved antenna elements are axially spaced along said antenna housing, wherein grooves comprising each said set of grooved antenna elements are essentially parallel to the major axis of said antenna housing; and a first and a second set of hole antenna elements disposed axially in said antenna housing between said first and second sets of grooved antenna elements, wherein said first and said second sets of said hole elements are azimuthally spaced around the periphery of said antenna housing, wherein holes comprising each said set of hole elements are essentially perpendicular to said major axis of said antenna housing.

2. The magnetic dipole antenna of claim 1 wherein:
said hole antenna elements comprise ferromagnetic material disposed within each of said holes;
non-conducting inserts terminates each end of said holes;
a slit extending radially outward from said hole to an outer surface of said antenna housing; and
an antenna wire essentially parallel to said major axis of said tool and traverses each said slit parallel to said major axis of said antenna housing.

3. The magnetic dipole antenna of claim 1 wherein the radial dimension of each said insert is greater than the azimuthal dimension of said insert.

4. The magnetic dipole antenna of claim 1 wherein said grooves comprise:
ferromagnetic material disposed in the radially inward portion of each of said grooves;
non-conducting material disposed within the radially outward portion of each of said grooves; and
antenna wire traversing said non-conducting material essentially perpendicular to said major axis of said antenna housing.

5. The magnetic dipole antenna of claim 1 further comprising a first and a second oscillator for applying a first and a second current to said grooved antenna sets and to said hole antenna sets.

6. The magnetic dipole antenna of claim 5 wherein said first and said second oscillators are numerically controlled for adjusting said first and said second currents to generate a steerable magnetic moment vector.

7. The magnetic dipole antenna of claim 5 further comprising a first and a second converter for receiving said first and said second currents generated by said grooved antenna sets and said hole antenna sets.

8. A measurement-while-drilling tool including at least one magnetic dipole antenna, said tool further comprises:
a drill collar; and
a transmission-receiver circuit;
wherein each said magnetic dipole antenna comprises:
a first and a second set of grooved antenna elements, wherein said first and said second sets of grooved antenna elements are axially spaced along said drill collar, wherein grooves comprising each said set of grooved antenna elements are essentially parallel to the major axis of said drill collar; and
a first and a second set of hole antenna elements disposed axially in said drill collar between said first and second sets of grooved antenna elements, wherein said first and said second sets of said hole elements are azimuthally spaced around the periphery of said drill collar, wherein holes comprising each said set of hole elements are essentially perpendicular to said major axis of said drill collar; and
wherein each said magnetic dipole antenna is electrically connected to said transmission-receiver circuit.

9. The measurement-while-drilling tool of claim 8 wherein:
said hole antenna elements comprise ferromagnetic material disposed within each of said holes;
non-conducting inserts terminates each end of said holes;
a slit extending radially outward from said hole to an outer surface of said antenna housing; and
an antenna wire essentially parallel to said major axis of said tool and traverses each said slit parallel to said major axis of said antenna housing.

10. The measurement-while-drilling tool of claim 9 wherein the radial dimension of each said insert is greater than the azimuthal dimension of said insert.

11. The measurement-while-drilling tool of claim 8 wherein said grooves comprise:
ferromagnetic material disposed in the radially inward portion of each of said grooves;
non-conducting material disposed within the radially outward portion of each of said grooves; and
antenna wire traversing said non-conducting material essentially perpendicular to said major axis of said drill collar.

12. The measurement-while-drilling tool of claim 8 wherein said transmission-receiver circuit comprises a first and a second oscillator for applying a first and a second current to said grooved antenna sets and to said hole antenna sets.

13. The measurement-while-drilling tool of claim 12 wherein said first and said second oscillators are numerically controlled for adjusting said first and said second currents to generate a steerable magnetic moment vector.

14. The measurement-while-drilling tool of claim 12 wherein said transmission-receiver circuit comprises a first and a second converter for receiving said first and said second currents generated by said grooved antenna sets and said hole antenna sets.

15. A method for generating a steerable magnetic moment vector using a magnetic dipole antenna disposed in an antenna housing, the method comprising:
providing a first and a second set of grooved antenna elements, wherein said first and said second sets of grooved antenna elements are axially spaced along said antenna housing, wherein grooves comprising each said set of grooved antenna elements are essentially parallel to the major axis of said antenna housing; and
providing a first and a second set of hole antenna elements disposed axially in said antenna housing between said first and second sets of grooved antenna elements, wherein said first and said second sets of said hole elements are azimuthally spaced around the periphery of said antenna housing, wherein holes comprising each said set of hole elements are essentially perpendicular to said major axis of said antenna housing;
applying a first current and a second current to said grooved antenna sets and to said hole antenna sets; and
adjusting said first and said second currents to obtain said magnetic moment vector in a predetermined direction.

16. The method of claim 15 further comprising applying a first and a second current to said grooved antenna sets and to said hole antenna sets with a first and a second oscillator.

17. The method of claim 16 wherein said first and said second oscillators are numerically controlled for adjusting said first and said second currents to generate said steerable magnetic moment vector.

18. The method of claim 15 further comprising receiving said first and said second currents generated by said grooved antenna sets and said hole antenna sets with a first and a second converter.

19. The method of claim 15 further comprising combining said steerable magnetic moment vector with a measure of antenna housing azimuthal orientation to obtain an orientation of said antenna housing in three dimensions.

\* \* \* \* \*